(12) United States Patent
DeVilbiss

(10) Patent No.: US 7,542,315 B2
(45) Date of Patent: Jun. 2, 2009

(54) ACTIVE RECTIFIER

(75) Inventor: Alan D. DeVilbiss, Colorado Springs, CO (US)

(73) Assignee: Celis Semiconductor Corporation, Colorado Springs, CO (US)

( * ) Notice: Subject to any disclaimer, the term of this patent is extended or adjusted under 35 U.S.C. 154(b) by 174 days.

(21) Appl. No.: 11/564,932

(22) Filed: Nov. 30, 2006

(65) Prior Publication Data

US 2008/0130338 A1    Jun. 5, 2008

(51) Int. Cl.
H02M 5/42    (2006.01)
H02M 7/04    (2006.01)
H02M 7/68    (2006.01)

(52) U.S. Cl. .................... 363/84; 363/89; 363/125; 363/127

(58) Field of Classification Search ............... 363/84, 363/89, 125, 127, 67, 68
See application file for complete search history.

(56) References Cited

U.S. PATENT DOCUMENTS

| | | | | |
|---|---|---|---|---|
| 4,523,267 A | * | 6/1985 | Mehl | 363/87 |
| 4,730,243 A | * | 3/1988 | Glennon | 363/44 |
| 4,984,147 A | * | 1/1991 | Araki | 363/84 |
| 5,140,514 A | * | 8/1992 | Tuusa et al. | 363/81 |
| 5,311,419 A | * | 5/1994 | Shires | 363/65 |
| 5,321,598 A | * | 6/1994 | Moran | 363/41 |
| 5,751,567 A | * | 5/1998 | Toyozaki et al. | 363/89 |
| 6,038,152 A | * | 3/2000 | Baker | 363/89 |

* cited by examiner

*Primary Examiner*—Bao Q Vu
(74) *Attorney, Agent, or Firm*—Mark G. Pannell; Hanes & Schutz, LLC

(57) ABSTRACT

A voltage signal rectifier produces a rectified voltage signal from an input offset voltage signal. The voltage signal rectifier includes input offset, output, and reference nodes, two actively controlled current regulation elements (ACCREs), and two controllers. The input offset node is coupled to the input offset voltage signal. The rectified voltage signal is generated onto the output node. The reference node is coupled to a reference voltage for the input offset and rectified voltage signals. The ACCREs are coupled to the input offset node and one of the ACCREs is coupled to the output node. Each controller is configured to control the one of the ACCREs so that the ACCRE coupled to the output node allows current flow through it when the input offset voltage signal is higher than the rectified voltage signal and the other ACCRE is configured to allows current flow through it when the input offset voltage signal is lower than the rectified voltage signal.

21 Claims, 5 Drawing Sheets

ACTIVE RECTIFIER

BACKGROUND OF THE INVENTION

Radio frequency identification (RFID) chips typically include circuitry that rectifies a carrier wave to generate a regulated power supply for the chip. The carrier wave is generated by an RFID chip reader and received by an antenna of the RFIS chip. The further the reader is from the RFID chip, the weaker the carrier wave is when it reaches the RFID chip. Consequently, the further the reader is from the RFID chip, the lower the voltage and the amount of power available to the chip from the rectified carrier wave. In order to achieve the longest possible read distance, RFID chips are designed to operate at the lowest possible voltage. The RFID chips can operate at less than 2 Volts.

Often the rectifying circuitry includes a pair of diodes for achieving the rectification. Each diode has a characteristic forward voltage drop. The forward voltage drop is the voltage drop as current passes through the diode when the diode is forward biased. These forward voltage drops can be 700 mV to 800 mV. Taking these voltages drops into account, the maximum operating voltage achievable by the rectifying circuitry is the peak-to-peak voltage on the antenna less the sum of the forward voltage drops of the rectifying diodes. Since the operating voltage of an RFID chip can be less than 2 Volts, the forward voltage drops of the rectifying diodes can account for a significant portion of the peak-to-peak voltage received by the RFID chip antenna.

DETAILED DESCRIPTION OF THE INVENTION

Figure 1:
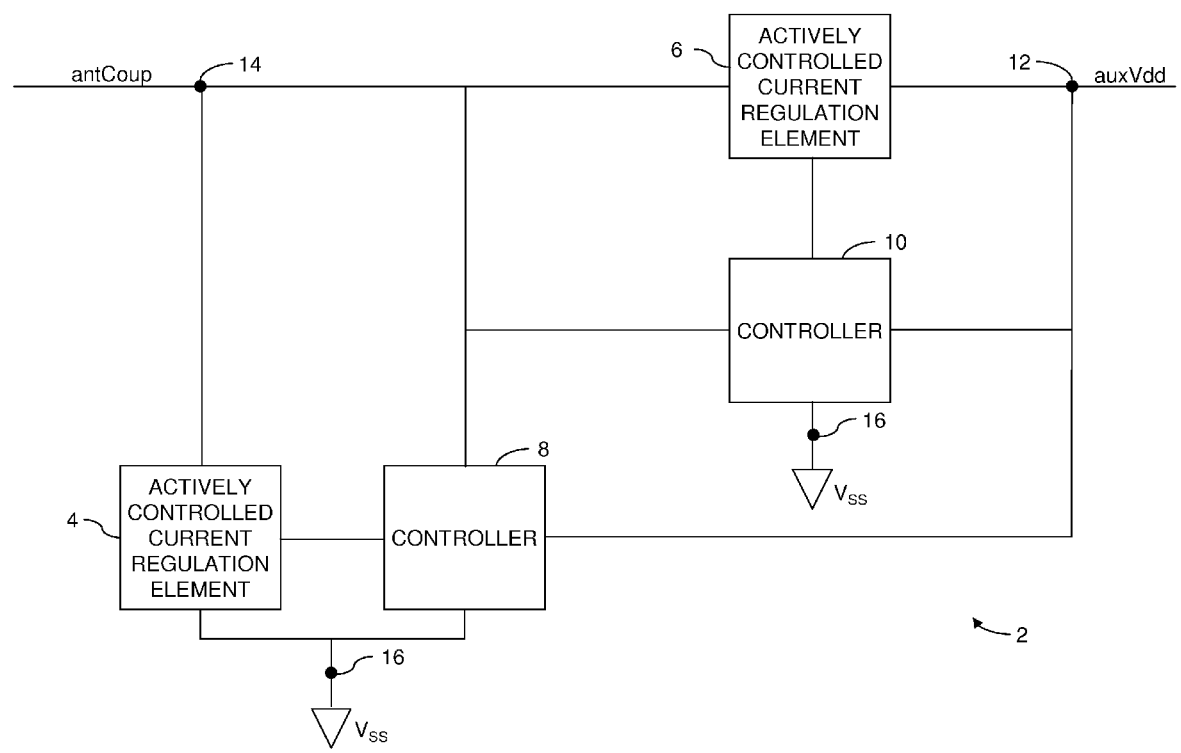
FIG. 1 is block diagram of one embodiment of the present invention rectifier.

FIG. 1 is a block diagram illustrating one embodiment of a rectifier 2 for producing a rectified voltage signal auxVdd from an input offset voltage signal antCoup. Both voltage signals, auxVdd and antCoup, are voltage signals referenced to reference voltage $V_{ss}$.

Rectifier 2 includes first 4 and second 6 actively controlled current regulation elements (ACCREs), and first 8 and second 10 controllers. Also shown in FIG. 1 are output node 12, input offset node 14, and reference node 16.

Nodes 12, 14, and 16 are merely points of reference, provided to assist in the description and understanding of the invention. Input offset node 14 is coupled to input offset voltage signal antCoup, reference node 16 is coupled to reference voltage $V_{ss}$, and rectified voltage signal auxVdd is generated onto output node 12. However, input offset voltage signal antCoup, rectified voltage signal auxVdd, and reference voltage $V_{ss}$ may not always be present in rectifier 2. Therefore, it is convenient to refer to the nodes on which those signals would exist when they are present.

Each node of the same type appearing in a Figure is coupled to each other node of the same type appearing in the same Figure, even though the coupling is not shown. For example, FIG. 1 includes two reference nodes 16. Each reference node 16 is coupled to the other reference node 16, but the coupling is not shown so that the Figure may be more clearly understood.

First 4 and second 6 ACCREs are devices or combinations of devices which regulate the flow of current passing through them. Each ACCRE is controlled by an external signal which determines the amount of current allowed to flow through first 4 and second 6 ACCRE.

First 4 and second 6 ACCREs are coupled to input offset voltage signal antCoup or input offset node 14. First ACCRE is additionally coupled to reference voltage $V_{ss}$ or reference node 16.

In one embodiment, second ACCRE 6 is coupled to output node 12. Alternatively, output node 12 may be considered to be integral to second ACCRE 6 such that second ACCRE 6 includes output node 12.

First 8 and second 10 controllers provide the external signals which determine the amount of current allowed to flow through first 4 and second 6 ACCRE, respectively. First controller 8 is configured to control first ACCRE 4 to allow current flow through first ACCRE 4 when input offset voltage signal antCoup is lower than rectified voltage signal auxVdd. Second controller 10 is configured to control second ACCRE 6 to allow current flow through second ACCRE 6 when input offset voltage signal antCoup is higher than rectified voltage signal auxVdd.

First 8 and second 10 controllers are coupled to input offset voltage signal antCoup (input offset node 4), rectified voltage signal auxVdd (output node 6), and reference voltage $V_{ss}$ (reference node 16).

Figure 2:
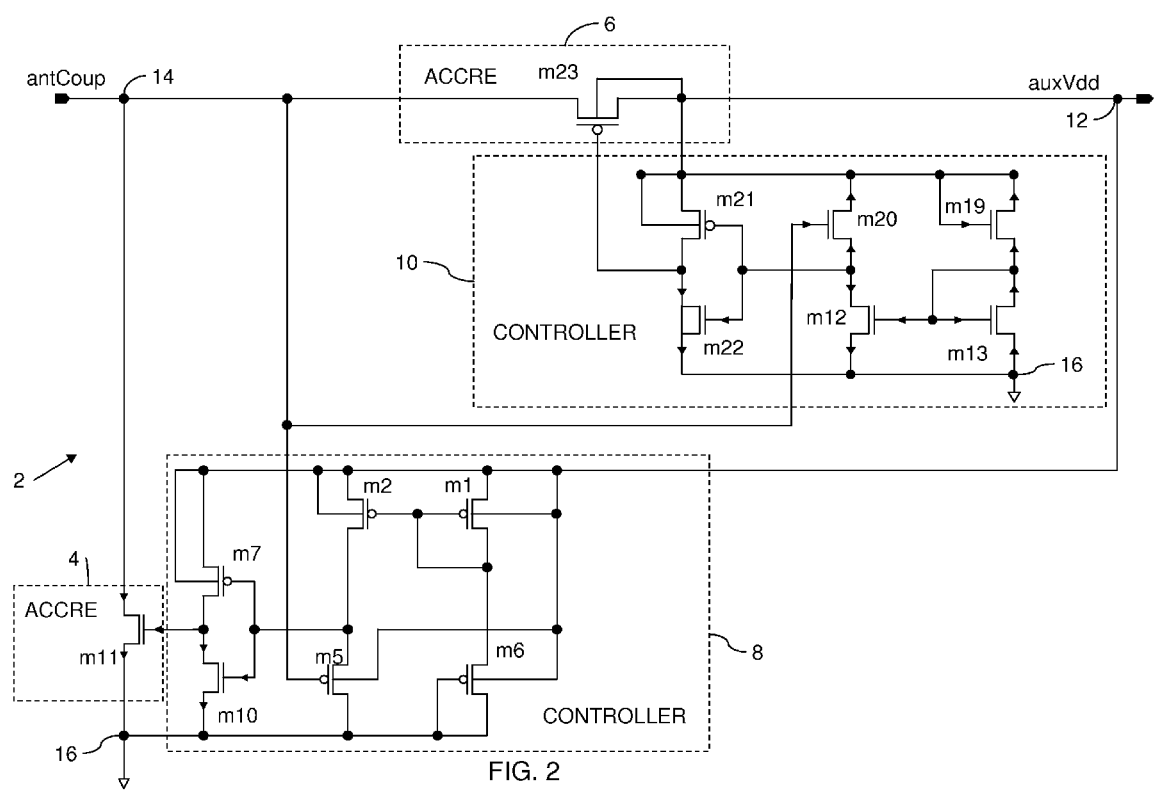
FIG. 2 is circuit diagram of one embodiment of the rectifier of FIG. 1.

FIG. 2 is circuit diagram of one embodiment of the rectifier of FIG. 1. Elements in FIG. 2 that are like elements to elements in FIG. 1 are given the same reference number as in FIG. 1.

In one embodiment, first ACCRE 4 is an n-channel metal-oxide semiconductor field-effect transistor (mosfet) m11 having a gate coupled to first controller 8, a source coupled to input offset node 4, and a drain coupled to reference node 8. In another embodiment, the source is coupled to input offset voltage signal antCoup and the drain is coupled to reference voltage $V_{ss}$.

In one embodiment, second ACCRE 6 is a p-channel mosfet m23 having a gate coupled to second controller 10, a source coupled to input offset node 4, and a drain coupled to output node 6. In another embodiment the source is coupled to input offset voltage source antCoup and the drain is coupled to rectified voltage signal auxVdd.

In one embodiment, first controller 8 includes n-channel mosfet m10 and p-channel mosfets m1, m2, m5, m6, and m7. Each of the mosfets m1, m2, m5, m6, m7, and m10 has a gate, a source, and a drain. The mosfets m1, m2, m5, m6, m7, and m10 are arranged as follows:

The gate and drain of mosfet m1 are coupled to the gate of mosfet m2 and the source of mosfet m6. The source of mosfet m1 is coupled to output node 12 and rectified voltage signal auxVdd.

The source of mosfet m2 is coupled to output node 12 and rectified voltage signal auxVdd. The drain of mosfet m2 is coupled to the source of mosfet m5 and the gates of mosfets m7 and m10.

The gate and drain of mosfet m6 are coupled to reference node 16 and reference voltage $V_{ss}$.

The gate of mosfet m5 is coupled to input offset node 14 and input offset voltage signal antCoup. The drain of mosfet m5 is coupled to reference node 16 and reference voltage $V_{ss}$.

The source of mosfet m7 is coupled to output node 12 and rectified voltage signal auxVdd. The drain of mosfet m7 is coupled to the source of mosfet m10 and the gate of mosfet m11.

The drain of mosfet m10 is coupled to reference node 16 and reference voltage $V_{ss}$.

In this configuration, first controller 8 provides a high voltage signal to the gate of mosfet m11 when input offset voltage signal antCoup is lower than rectified voltage signal auxVdd, allowing current to flow from input offset node 14 and input offset voltage signal antCoup to reference node 16 and reference voltage $V_{ss}$ with a small source-to-drain voltage on mosfet m11. This source-to-drain voltage could be as small as about 200 mV.

In one embodiment, second controller 10 includes p-channel mosfet m21 and n-channel mosfets m12, m13, m19, m20, and m22. Each of the mosfets m12, m13, m19, m20, m21, and m22 has a gate, a source, and a drain. The mosfets m12, m13, m19, m20, m21, and m22 are arranged as follows:

The gate and source of mosfet m13 are coupled to the gate of mosfet m12 and the drain of mosfet m19. The drain of mosfet m13 is coupled to reference node 16 and reference voltage $V_{ss}$.

The drain of mosfet m12 is coupled to reference node 16 and reference voltage $V_{ss}$. The source of mosfet m12 is coupled to the drain of mosfet m20 and the gates of mosfets m22 and m21.

The gate and source of mosfet m19 are coupled to output node 12 and rectified voltage signal auxVdd.

The gate of mosfet m20 is coupled to input offset node 14 and input offset voltage signal antCoup. The source of mosfet m20 is coupled to output node 12 and rectified voltage signal auxVdd.

The drain of mosfet m22 is reference node 16 and reference voltage $V_{ss}$. The source of mosfet m22 is coupled to the drain of mosfet m21 and the gate of mosfet m23.

The source of mosfet m21 is coupled output node 12 and rectified voltage signal auxVdd.

In this configuration, second controller 10 provides a low voltage signal to the gate of mosfet m23 when input offset voltage signal antCoup is higher than rectified voltage signal auxVdd, allowing current to flow from input offset node 14 and input offset voltage signal antCoup to output node 12 and rectified voltage signal auxVdd with a small source-to-drain voltage on mosfet 23. This source-to-drain voltage could be as small as about 200 mV.

Figure 3:
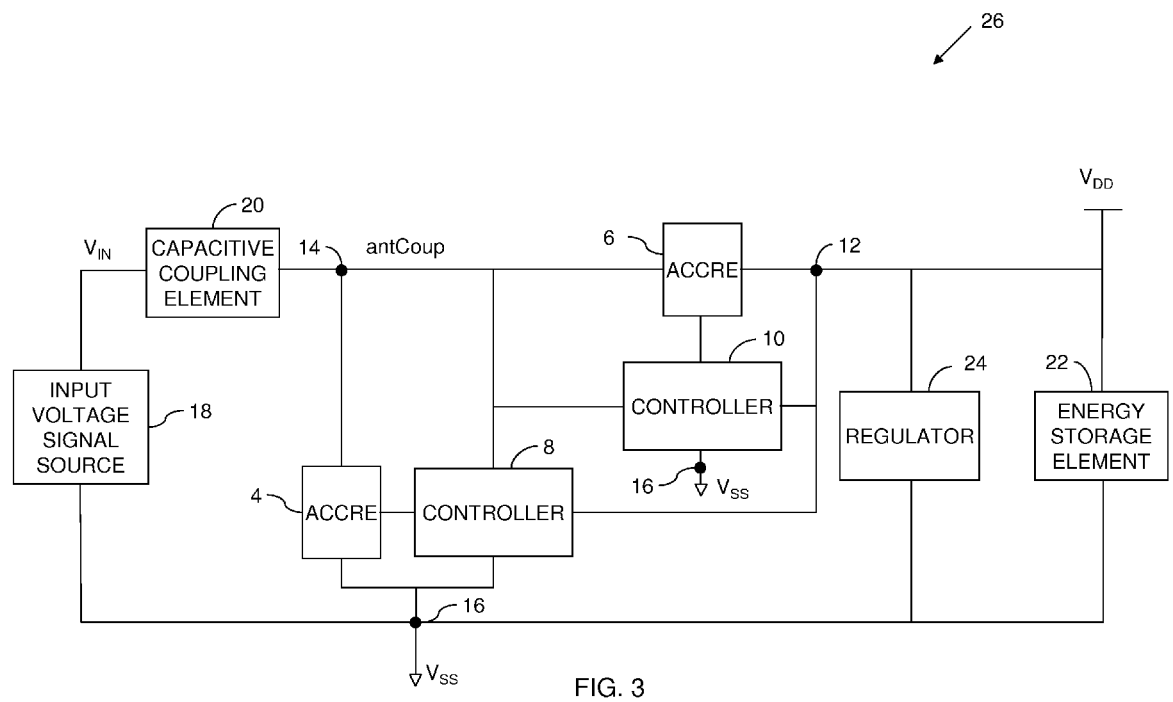
FIG. 3 is block diagram showing one embodiment a power supply including the rectifier of FIGS. 1 and 2.

FIG. 3 is block diagram showing one embodiment of a power supply 26 including rectifier 2. In one embodiment, power supply 26 includes voltage signal source 18, capacitive coupling 20, energy storage element 22, first 4 and second 6 ACCREs, first 8 and second 10 controllers, and regulator means 24.

Power supply 26 creates a voltage difference between high $V_{DD}$ and low $V_{ss}$ power supply rails, suitable for use as a power supply for an RFID chip (not shown). Depending on design criteria, high power supply rail $V_{DD}$ may be the same as rectified voltage signal auxVdd.

Voltage signal source 18 provides a radio frequency (RF) signal, input voltage signal $V_{IN}$, to coupling capacitive element 20. In one embodiment, this RF signal, input voltage signal $V_{IN}$, is induced in voltage signal source 18 by an RFID chip reader (not shown). Coupling capacitive element 20 is connected to voltage signal source 18 and causes a direct current (dc) voltage offset in input voltage signal $V_{IN}$ to create input offset voltage signal antCoup.

As described above, first 4 and second 6 ACCREs and first 8 and second 10 controllers rectify the input voltage signal antCoup from coupling capacitive element 20. First 4 and second 6 ACCREs are coupled to voltage signal source 18 through coupling capacitive element 20. Second ACCRE 6 is coupled to high power supply rail $V_{DD}$. First controller 8 is configured to control first ACCRE 4 to allow current flow through first ACCRE 4 when input voltage signal antCoup is lower than high power supply rail $V_{DD}$. Second controller 10 is configured to control second ACCRE 6 to allow current flow through second ACCRE 6 when input voltage signal antCoup is higher than high power supply rail $V_{DD}$.

In one embodiment, energy storage element 22 includes a capacitive element 22, such as single capacitor, a group of capacitors, or any other single device or group of devices that have suitable capacitive properties. Alternatively, energy storage element 22 includes any other component or element for storing and releasing energy for application to an integrated circuit.

Energy storage element 22 stores the energy between the high $V_{DD}$ and low $V_{ss}$ power supply rails. Regulator 24 regulates the level of energy stored in energy storage element 22.

In one embodiment, energy storage element 22 stores energy for application to the integrated circuit. For instance, energy storage element 22 may store energy at around 1.2 volts for use by an integrated circuit such as a radio frequency identification (RFID) circuit. The energy stored by energy storage element 22 may be represented by the voltage auxVdd with respect to a reference voltage $V_{ss}$ for the integrated circuit.

In one embodiment, the energy stored in energy storage element 22 is directly applied to and powers the integrated circuit. In alternate embodiments, the energy stored in energy storage element 22 powers the integrated circuit, but is applied to the integrated circuit through intervening elements, consistent with the operation of the integrated circuit.

Figure 4:
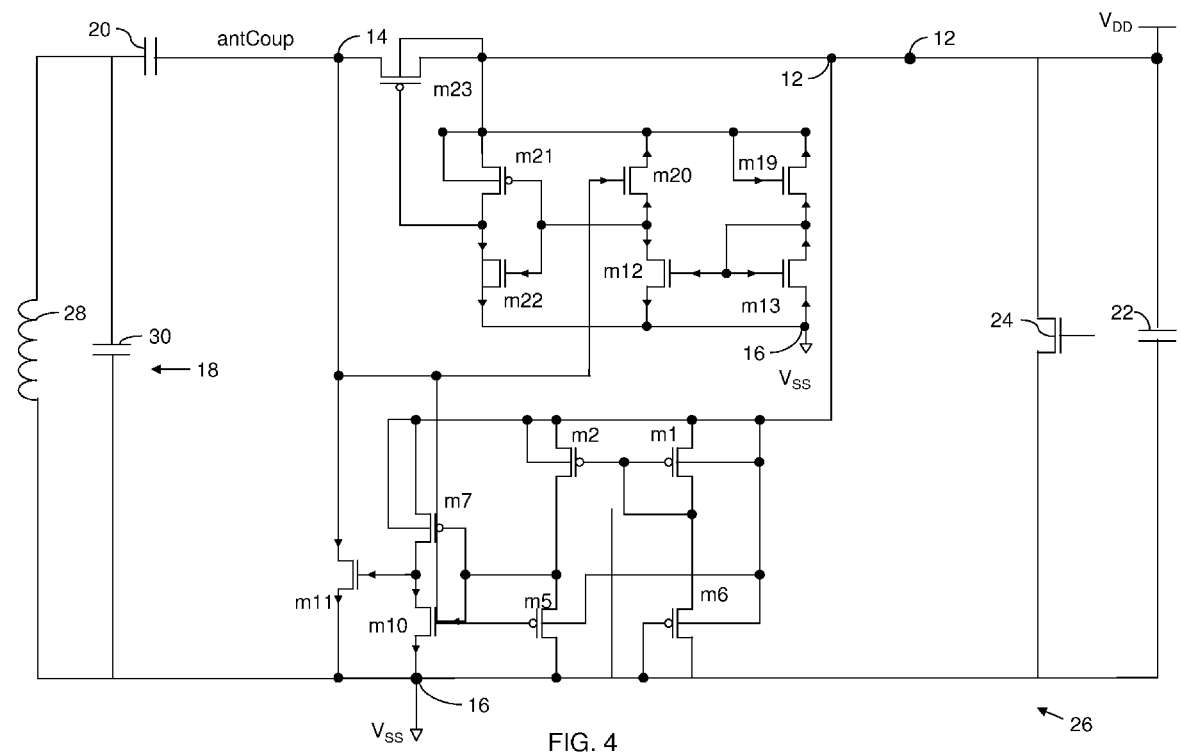
FIG. 4 shows one embodiment a circuit diagram for the power supply of FIG. 3.

FIG. 4 shows one embodiment a circuit diagram for the power supply of FIG. 3. Elements in FIG. 4 that are like elements to elements in FIG. 3 are given the same reference number as in FIG. 3.

In one embodiment, voltage signal source 18 includes an antenna 28 and a tuning capacitive element 30 in parallel with antenna 28. In one embodiment, input voltage signal $V_{IN}$ is induced in antenna 28 by an RFID chip reader (not shown).

In one embodiment, regulator means 24 includes a shunt regulator 24 for regulating the level of energy stored in the energy storage element 22. In one embodiment, shunt regulator 24 is in a parallel configuration with energy storage element 22. In one embodiment, shunt regulator 24 is a mosfet shunt regulator operated to maintain a desired voltage level across energy storage element 22.

Any type of suitable control means may be used to control the gate of mosfet shunt regulator 24 in order to control the current flowing through shunt regulator 24. For example, a feedback control means using as input the voltage across capacitive element 22 may be used to control the gate of shunt regulator 24.

Any combination of energy storage element 22, rectifier 2, and shunt regulator 24 may be embodied within an integrated circuit. Additionally, any combination of energy storage element 22, rectifier 2, and shunt regulator 24 may be embodied with the integrated circuit on a chip.

Figure 5:
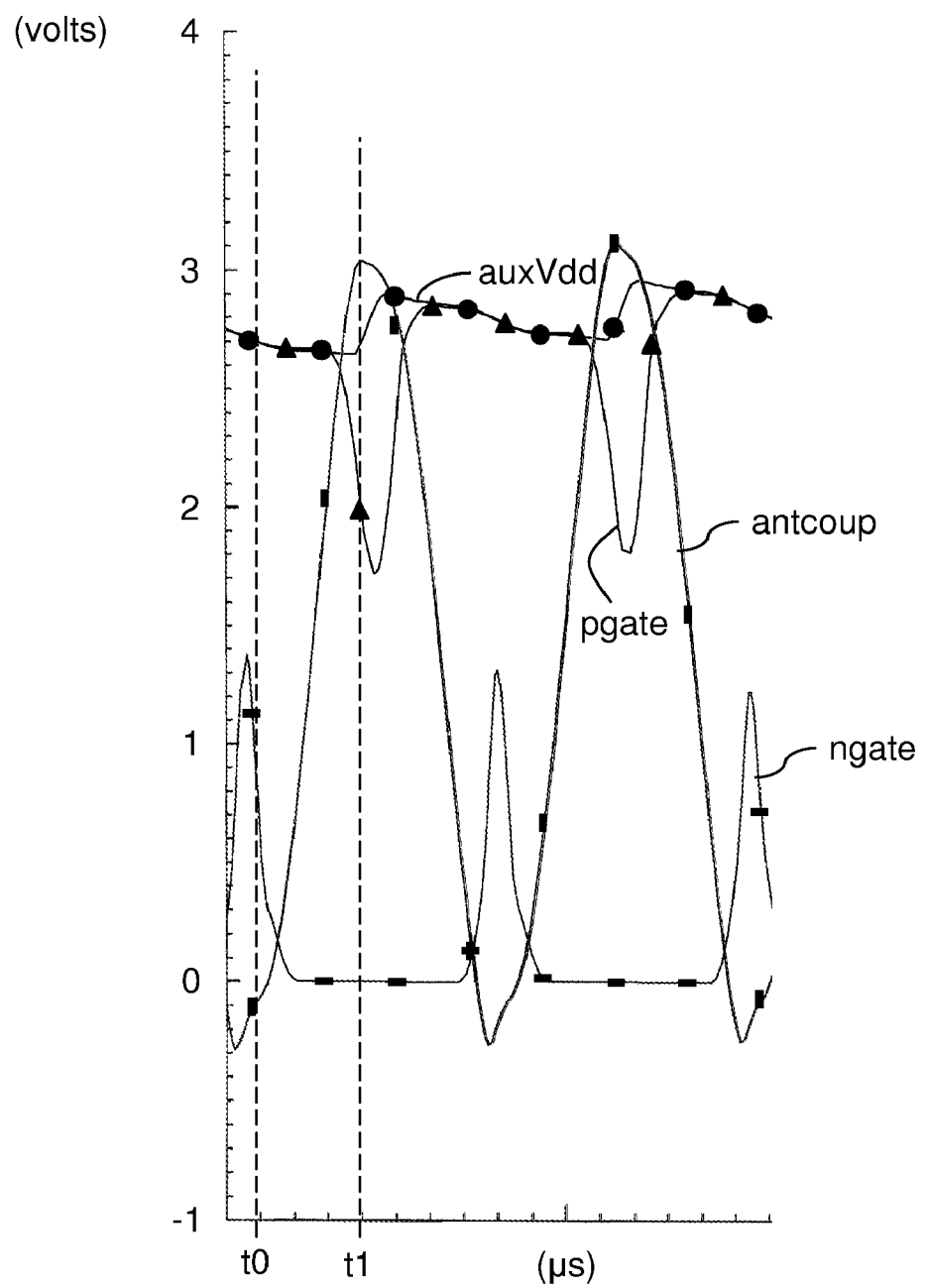
FIG. 5 is a timing diagram illustrating the operation of the rectifier of FIGS. 1 and 2.

FIG. 5 is a timing diagram illustrating the operation of rectifier 2. For reference, the signal on the gate of mosfet m11 will be called ngate and the signal on the gate of mosfet m23 will be called pgate. AntCoup is a roughly sinusoidal waveform with a dc offset as compared to reference voltage $V_{ss}$.

Each of the voltages signals in FIG. 5 is referenced to reference voltage $V_{ss}$, so that voltages equaling $V_{ss}$ are shown on the diagram as zero volts.

At time $t_0$, input offset voltage signal antCoup is lower than rectified voltage signal auxVdd. Voltage signal ngate is driven high, allowing current to flow from input offset node 14 and input offset voltage signal antCoup to reference node 16 and reference voltage $V_{ss}$.

As input offset voltage signal antCoup swings higher and closer to rectified voltage signal auxVdd, both ngate and pgate signals drop. At time $t_1$, input offset voltage signal antCoup is higher than rectified voltage signal auxVdd. Voltage signal pgate is low, allowing current to flow from input offset node 14 and input offset voltage signal antCoup to output node 12 and rectified voltage signal auxVdd.

From the graph in FIG. 1, it can then be seen that the voltage drop across rectifier 2 can be as small as about 400 mV. That is the difference between the voltage peak of antCoup and the voltage minimum of auxVdd is about 400 mV.

The foregoing description is only illustrative of the invention. Various alternatives, modifications, and variances can be devised by those skilled in the art without departing from the invention. Accordingly, the present invention embraces all such alternatives, modifications, and variances that fall within the scope of the described invention.

What is claimed is:

1. A voltage signal rectifier for producing a rectified voltage signal from an input offset voltage signal with reference to a reference voltage, the voltage signal rectifier comprising:
   an input offset node coupled to the input offset voltage signal;
   an output node onto which the rectified voltage signal is generated;
   a reference node coupled to the reference voltage;
   first and second actively controlled current regulation elements (ACCREs) coupled to the input offset node, the second ACCRE coupled to the output node, the first ACCRE controlling a flow of current from the input offset node to the reference node, the second ACCRE controlling a flow of current from the input offset node to the output node; and
   first and second controllers, the first controller configured to control the first ACCRE to allow current flow through the first ACCRE when the input offset voltage signal is lower than the rectified voltage signal, the second controller configured to control the second ACCRE to allow current flow through the second ACCRE when the input offset voltage signal is higher than the rectified voltage signal.

2. The voltage signal rectifier of claim 1 wherein the first ACCRE is coupled to the reference node.

3. The voltage signal rectifier of claim 1 wherein the first and second controllers are coupled to the input offset node.

4. The voltage signal rectifier of claim 1 wherein the first and second controllers are coupled to the output node.

5. The voltage signal rectifier of claim 1 wherein the first and second controllers are coupled to the reference node.

6. The voltage signal rectifier of claim 1 wherein the first ACCRE is an n-channel mosfet having a gate coupled to the first controller, a source coupled to the input offset node, and a drain coupled to the reference node.

7. The voltage signal rectifier of claim 1 wherein the second ACCRE is a p-channel mosfet having a gate coupled to the second controller, a source coupled to the input offset node, and a drain coupled to the output node.

8. A power supply for creating a rectified voltage signal between high and low power supply rails, the power supply comprising:
   a voltage signal source for providing an input voltage signal;
   a coupling capacitive element connected to the voltage signal source and for creating an input offset voltage signal from the input voltage signal;
   an energy storage element for storing energy between the high and low power supply rails;
   first and second actively controlled current regulation elements (ACCREs) coupled to the voltage signal source, the second ACCRE coupled to the high power supply rail, the first ACCRE controlling a flow of current from the input offset voltage signal to the low power supply rail, the second ACCRE controlling a flow of current from the input offset voltage signal to the high power supply rail;
   first and second controllers, the first controller configured to control the first ACCRE to allow current flow through the first ACCRE when the input offset voltage signal is lower than the high power supply rail, the second controller configured to control the second ACCRE to allow current flow through the second ACCRE when the input offset voltage signal is higher than the high power supply rail; and
   regulator means for regulating the level of energy stored in the energy storage element.

9. The power supply of claim 8 wherein the first ACCRE is coupled to the low power supply rail.

10. The power supply of claim 8 wherein the first and second controllers are coupled to the voltage signal source.

11. The power supply of claim 8 wherein the first and second controllers are coupled to the high power supply rail.

12. The power supply of claim 8 wherein the first and second controllers are coupled to the low power supply rail.

13. The voltage signal rectifier of claim 8 wherein the first ACCRE is an n-channel mosfet having a gate coupled to the first controller, a source coupled to the voltage signal source, and a drain coupled to the low power supply rail.

14. The voltage signal rectifier of claim 8 wherein the second ACCRE is an p-channel mosfet having a gate coupled to the second controller, a source coupled to the voltage signal source, and a drain coupled to the high power supply rail.

15. A voltage signal rectifier for producing a rectified voltage signal from an input offset voltage signal, the rectified voltage signal and the input offset voltage signal referenced to a reference voltage signal, the voltage signal rectifier comprising:
   first and second actively controlled current regulation elements (ACCREs) coupled to the input offset voltage signal, the second ACCRE having an output node for outputting the rectified voltage signal, the first ACCRE controlling a flow of current from the input offset voltage signal to the reference voltage signal, the second ACCRE controlling a flow of current from the input offset signal to the output node; and
   first and second controllers, the first controller configured to control the first ACCRE to allow current flow through the first ACCRE when the input offset voltage signal is lower than the rectified voltage signal, the second controller configured to control the second ACCRE to allow current flow through the second ACCRE when the input offset voltage signal is higher than the rectified voltage signal.

16. The voltage signal rectifier of claim 15 wherein the rectified voltage signal and the input offset voltage signal are in reference to a reference voltage and the first ACCRE is coupled to the reference signal.

17. The voltage signal rectifier of claim 15 wherein the first and second controllers are coupled to the input offset voltage signal.

18. The voltage signal rectifier of claim 15 wherein the first and second controllers are coupled to the output node.

19. The voltage signal rectifier of claim 15 wherein the rectified voltage signal and the input offset voltage signal are in reference to a reference voltage and the first and second controllers are coupled to the reference voltage.

20. The voltage signal rectifier of claim 15 wherein the rectified voltage signal and the input offset voltage signal are in reference to a reference voltage and the first ACCRE is an n-channel mosfet having a gate coupled to the first controller, a source coupled to the input offset voltage signal, and a drain coupled to the reference voltage.

21. The voltage signal rectifier of claim 15 wherein the second ACCRE is a p-channel mosfet having a gate coupled to the second controller, a source coupled to the input offset voltage signal, and a drain coupled to the output node.

* * * * *